April 5, 1938.                F. LECHENE                2,112,913
                                VALVE
                         Filed Nov. 18, 1936

INVENTOR
FRANÇOIS LECHENE
BY Haseltine Lake & Co.
   ATTORNEYS

Patented Apr. 5, 1938

2,112,913

UNITED STATES PATENT OFFICE 2,112,913

VALVE

François Lechene, Brussels, Belgium

Application November 18, 1936, Serial No. 111,524
In Belgium December 11, 1935

4 Claims. (Cl. 251—51)

The present invention relates to improvements in valves and particularly those having a straight passage, and has for its object to combine with the advantage inherent in this type of valve, that is to say, the absence of loss of head of the fluid which passes through it, the obviation of its disadvantages, namely lack of tightness, the resistance to movement when opening, which manifest themselves particularly in the case of valves having a trapezoidal or wedge-shaped obturator.

The valve according to the invention comprises a metal obturator in the form of a truncated conical sleeve, provided with a slot which the elasticity of the metal tends to maintain open, in such a way that when the obturator is pushed into a seating of corresponding conical shape, the edges of the groove close up and the obturator exactly fits the surface of the seating wall against which it is elastically applied around the whole of its periphery. The operating spindle of the valve preferably passes through the sleeve from end to end and its extremity carries a shoulder intended to disengage the obturator from its seating when the valve is open. No jamming of the obturator in its seating is therefore to be feared. On the other hand, the tightness of the closure is practically invariable, in view of the absence of friction, and consequently the absence of wear.

In order that the invention may be more clearly understood reference will now be made to the accompanying drawing which shows by way of example a preferred embodiment thereof.

In the drawing.

In the drawing like references designate the same or similar parts.

Figure 1:
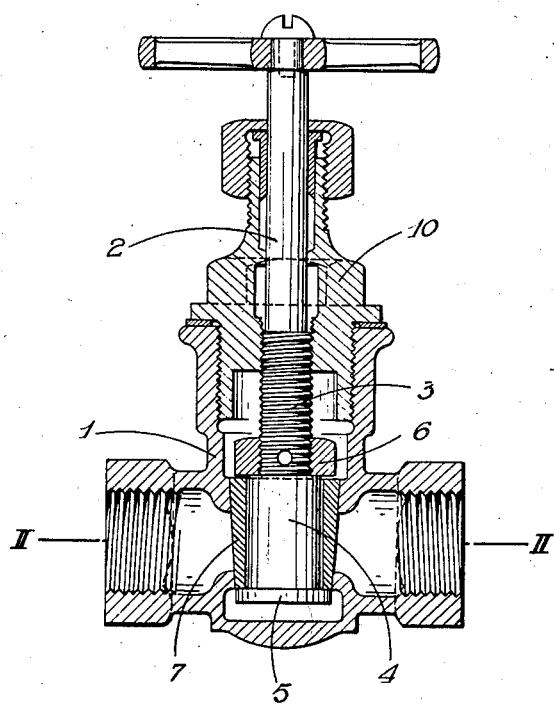
Fig. 1 is a longitudinal section of the valve.
Figure 3:
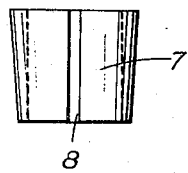
Fig. 3 shows the obturator in elevation.
Figure 4:
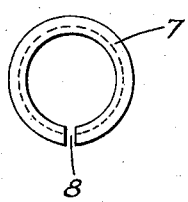
Fig. 4 shows it in plan.
Figure 2:
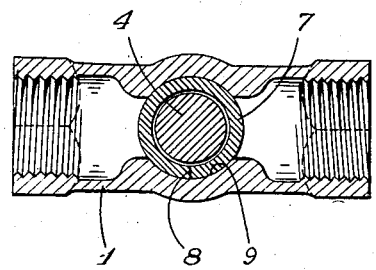
Fig. 2 is a horizontal section along the line II—II of Fig. 1.

In the example under consideration, I designates the seating of the valve in which the operating spindle 2 moves axially, this spindle having a screw-threaded portion 3 and a cylindrical portion 4 terminating in a shoulder 5. On the cylindrical portion 4, between the shoulder 5 and a nut or second shoulder 6, is mounted the obturator 7 constituted by a sleeve of truncated conical form of which the interior cylindrical wall can turn on the spindle. The sleeve 7 has a longitudinal straight slot 8. Its taper and section are such that when it is pushed into the seating, its exterior surface exactly fits the conical interior surface 9 of the seating 1. In other words, like a piston ring, the sleeve in the free state has a section which is slightly oval, determined in such a manner as to become circular when the edges of the slot meet again.

When the spindle 2 is screwed into the bonnet 10 of the valve, the shoulder 6 pushes the obturator 7 towards its seating. From the moment when contact between the seating and the obturator occurs, the latter no longer rotates with the spindle, but the two edges of its slot 8 approach one another until they meet. When the obturator is pushed to the bottom, it presses resiliently against its seating thereby ensuring complete tightness thereof.

In order to open the valve it is sufficient to turn the spindle 2 in the opposite direction. The shoulder 5 immediately disengages the obturator from its seating, and the opening is effected without any appreciable resistance, the obturator reassuming its original form, by reason of its elasticity, when it is freed.

Figure 5:
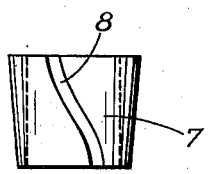
Fig. 5 shows an obturator with helical slot.

It can be seen that the valve according to the invention combines the obtaining of perfect tightness, with great simplicity and great ease of operation. Instead of being straight, the slot in the obturator may be helicoidal (Fig. 5), the bearing surface 4 may be conical and other constructional modifications may obviously be applied to the valve illustrated without departing from the scope of the appended claims.

I claim:

1. In a straight-through valve, a casing, a conical seat of circular cross-section in said casing, an axially movable obturator co-operating with said seat, said obturator comprising a split sleeve of frusto-conical shape, said sleeve being of resilient metal and the split therein normally tending to form an open slot, the section of said sleeve being of non-circular form when said slot is open, said section being determined so that it becomes circular and fits exactly in said seat when the edges of the slot meet under the effect of compression.

2. In a straight-through valve, a casing, a conical seat in said casing, an axially movable obturator co-operating with said seat, said obturator comprising a split metal sleeve of frusto-conical shape adapted to fit exactly in said seat when the edges of its slot meet under the effect of compression, the said edges normally tending to be slightly apart from each other, and means for moving said obturator towards and away from said seat.

3. In a straight-through valve, a casing, a conical seat in said casing, an axially movable obturator co-operating with said seat, said obturator comprising a resilient split sleeve of frusto-conical shape, the split forming a normally open slot adapted to be closed by co-action with said seat, a spindle for moving said sleeve towards and away from said seat, said sleeve being rotatable on said spindle.

4. In a straight-through valve, a casing, a conical seat in said casing, an axially movable obturator co-operating with said seat, said obturator comprising a resilient split sleeve of frusto-conical shape, the split forming a normally open slot adapted to be closed by co-action with the conical wall of said seat, the section of said sleeve being so determined that it becomes circular when the edges of its slot are caused to meet, a spindle for moving said sleeve towards and away from said seat, said sleeve being rotatable on said spindle, and a shoulder on said spindle under said valve.

FRANÇOIS LECHENE.